(12) United States Patent
Annoura

(10) Patent No.: US 7,757,530 B2
(45) Date of Patent: Jul. 20, 2010

(54) PLANOGRAPHIC PRINTING PLATE MANUFACTURING APPARATUS

(75) Inventor: Yasuhiro Annoura, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/237,457

(22) Filed: Sep. 25, 2008

(65) Prior Publication Data

US 2009/0084241 A1   Apr. 2, 2009

(51) Int. Cl.
*B21D 13/00* (2006.01)

(52) U.S. Cl. .............................. 72/186; 72/185; 72/203; 83/495

(58) Field of Classification Search ................... 72/185, 72/186, 203; 83/495–504, 673
See application file for complete search history.

(56) References Cited

U.S. PATENT DOCUMENTS

| 4,785,699 | A | * | 11/1988 | Oblinger et al. | ................ | 83/425 |
| 2003/0131699 | A1 | * | 7/2003 | Lai et al. | ........................ | 83/13 |
| 2006/0137827 | A1 | * | 6/2006 | Uneyama et al. | ............ | 156/510 |

FOREIGN PATENT DOCUMENTS

| EP | 1 066 904 A1 | 1/2001 |
| EP | 1066904 B1 * | 4/2005 |
| EP | 1 623 782 A1 | 2/2006 |
| JP | 07-164235 | 6/1995 |
| JP | 2000-061724 A | 2/2000 |
| JP | 2001-018546 A | 1/2001 |
| JP | 2007-090441 A | 4/2007 |

OTHER PUBLICATIONS

EP Communication, dated Feb. 5, 2009, issued in corresponding EP Application No. 08016994.9, 6 pages.

* cited by examiner

*Primary Examiner*—Dana Ross
*Assistant Examiner*—Stephanie Jennings
(74) *Attorney, Agent, or Firm*—Sughrue Mion, PLLC

(57) ABSTRACT

The present invention provides a planographic printing plate manufacturing apparatus comprising: a cutting process section which cuts a web in a thickness direction of the web by pinching the web with at least a pair of an upper knife and a lower knife, wherein the lower knife includes a flat part supporting a center of the web, a decline part gradually declined an upper end toward outside from the flat part and a cutting edge part having an upper end gradually raised toward outside from the decline part to be a cutting edge, an angle of the lower knife at a boundary point between the decline part and the flat part is 135° or more, a boundary point between the decline part and the cutting edge part is provided so as to be greater or equal to a droop width of a lower surface of a cut product.

2 Claims, 7 Drawing Sheets

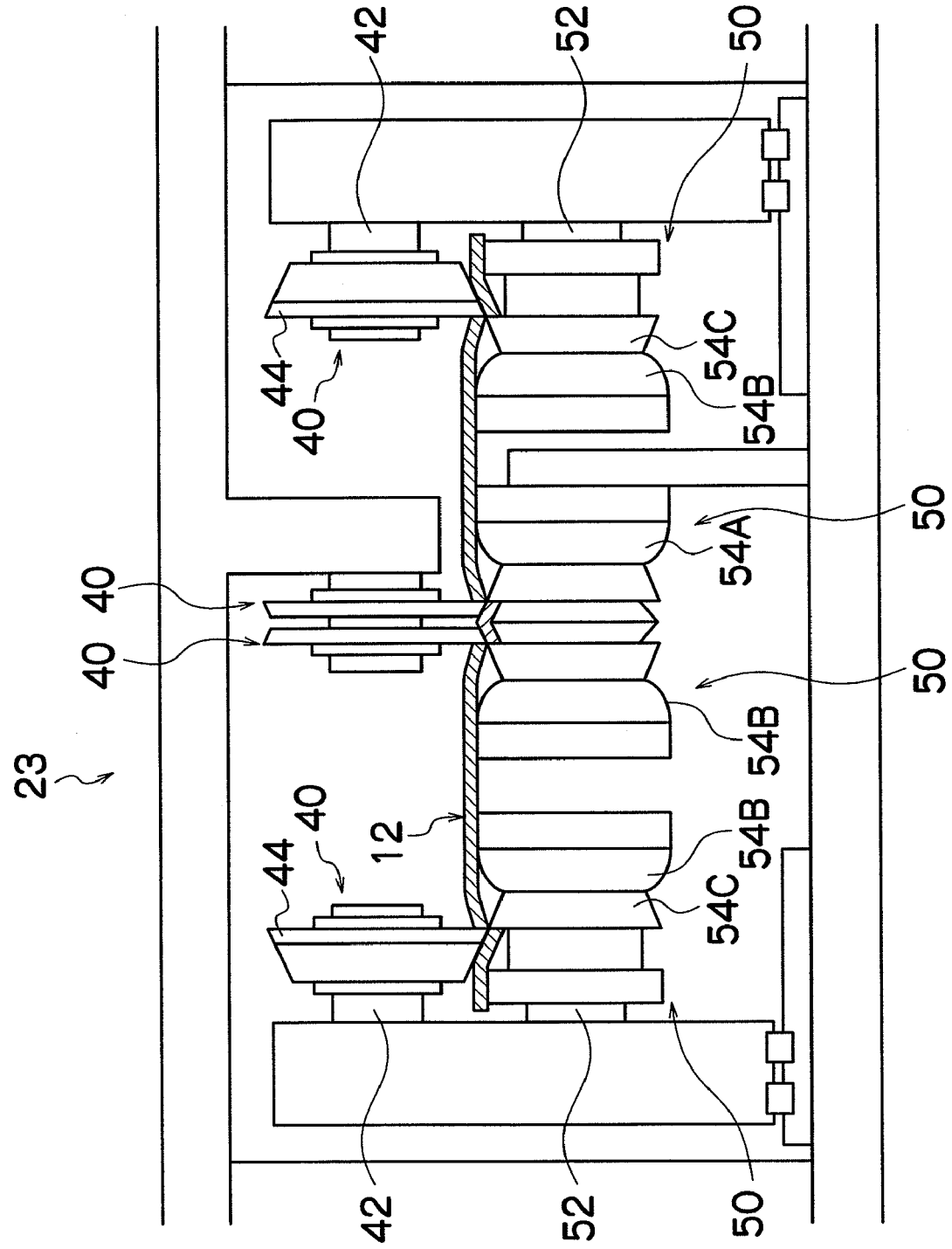

PLANOGRAPHIC PRINTING PLATE MANUFACTURING APPARATUS

BACKGROUND OF THE INVENTION

1. Field of the Invention

The present invention relates to a planographic printing plate manufacturing apparatus, and more particularly, to a photosensitive planographic printing plate manufacturing apparatus.

2. Description of the Related Art

In the engraving method (including the electronic photoengraving method) in recent years, planographic printing plates, such as a photosensitive printing plate and a heat sensitive printing plate, have been widely used in order to facilitate automation of a plate making process. The planographic printing plate is generally manufactured by such a way that a supporting body such as a sheet-like or coil-like aluminum plate is surface-treated by a separate process, such as for example, a graining process, an anodic oxidation process, a silicate process, an other chemical conversion process, or by properly combining these processes, and that the surface-treated supporting body is then coated with a photosensitive layer or a heat sensitive layer and dried, so as to thereafter be cut into a desired size. The manufactured planographic printing plate is subjected to plate making processes, such as an exposure process, a development process, and a gum coating process, and is set in a printing machine. Then, ink is applied to the planographic printing plate set in the printing machine. The applied ink is transferred from the planographic printing plate, so that characters, images and the like are printed on a paper surface.

Meanwhile, the planographic printing plate is manufactured through a cutting process for cutting a wide metallic web in the longitudinal direction. The cutting process is performed by such a way that paired upper and lower knives are provided, and the web is made to pass between the upper knife and the lower knife.

In the case of the metallic web, a rounded sag is formed on one cut surface, and a projecting burr is formed on the other cut surface. The web on which the burr is formed causes damage to the planographic printing plate used as a product. That is, in the manufacturing process, the products of planographic printing plates are stacked on a skid and directly set in a setter, and when the number of remaining planographic printing plates is reduced to be small, there is performed an operation in which the skid as a whole is exchanged, and the remaining planographic printing plates are stacked on the newly set skid. If the burr is present at this time, there occurs a trouble that the planographic printing plate is damaged by the projection of the burr.

On the other hand, in the case where the planographic printing plate is smaller than a printing paper, such as the case of a newspaper printing plate, the ink may adhere to the edge of the printing plate to cause a linear stain (also referred to as edge stain or frame stain). In order to suppress the edge stain, there is known a method in which the stress concentration of the printing roll is reduced by providing a round part in the edge on the side of the printing surface. To this end, the droop deformation obtained by the shearing is utilized.

However, the height of droop deformation and the projecting amount of the burr on the surface opposite the droop are correlated with each other. When the edge stain is intended to be prevented by increasing the droop height, there occurs a problem that the projecting amount of the burr is also increased, so as to thereby easily damage the printing plate. In order to solve the problem, a method in which the lower knife is formed at a predetermined inclination angle, is described in Japanese Patent Application Laid-Open No. 7-164235, Japanese Patent Application Laid-Open No. 2000-61724 and in FIG. 3 of Japanese Patent Application Laid-Open No. 2001-18546. However, in the former method, when the angle of the lower knife is made small to thoroughly suppress the burr from projecting from the web lower surface, a burr is formed by a raised part newly formed on the web lower surface. The newly formed burr may cause damage to the products when the products are stacked.

Further, in FIG. 6 and the description of Japanese Patent Application Laid-Open No. 2001-18546, there is described a method in which a level difference is provided by making the diameter at the cutting position of the lower knife smaller than the diameter of the receiving part.

SUMMARY OF THE INVENTION

However, in the method, when the level difference is increased to thoroughly prevent the burr from projecting from the web lower surface, the end of the web is largely warped downward, to cause a crack in the treated layer on the surface of the warped part. This results in a problem of causing stain in the crack.

Also, there is a problem that the lower surface of the cut web is scratched by the lower knife depending on its shape.

The present invention has been made in view of the above described circumstances. An object of the present invention is to provide a planographic printing plate manufacturing apparatus which is capable of surely preventing the occurrence of damages due to the warp and the scratch.

To attain the above described object, a first aspect of the present invention provides a planographic printing plate manufacturing apparatus comprising a cutting process section which cuts a web of a planographic printing plate in a thickness direction of the web by pinching the web with at least a pair of an upper knife and a lower knife, wherein the lower knife includes a flat part supporting a center of the web, a decline part gradually declined an upper end toward outside from the flat part and a cutting edge part having an upper end gradually raised toward outside from the decline part to be a cutting edge, an angle of the lower knife at a boundary point between the decline part and the flat part is 135° or more, and a boundary point between the decline part and the cutting edge part is provided so as to have a distance from the cutting edge in a width direction of the web which is greater or equal to a droop width of a lower surface of a product after the cutting process.

According to the first aspect of the present invention, the angle of the lower knife at the boundary point between the decline part and the flat part is 135° or more, thereby a change of an angle of the outer circumferential surface becomes small at the boundary point (close to flat). Therefore, the web can be prevented from bending over sharply and being damaged at the point. Also, according to the present invention, the boundary point between the decline part and the cutting edge part is provided so as to have the distance from the cutting edge in the width direction of the web which is greater or equal to the droop width of a lower surface of a product. Thus, the product can not be deformed until the lower surface of the web contacts with the decline part of the lower knife, so a scratch flaw can be suppressed by contacting the lower knife and the lower surface of the web. The droop width of the product lower surface is obtained by testing with a lower knife having a wide width of a cutting edge beforehand, and measuring a droop width (the width of the part drooped by the cutting edge) of a product lower surface.

To attain the above described object, a second aspect of the present invention provides a planographic printing plate manufacturing apparatus comprising a cutting process section which cuts a web of a planographic printing plate in a thickness direction of the web by pinching the web with at least a pair of an upper knife and a lower knife, wherein the lower knife includes a flat part supporting a center of the web, a decline part gradually declined an upper end toward outside from the flat part and a cutting edge part having an upper end gradually raised toward outside from the decline part to be a cutting edge, and the decline part is shaped swell upward. According to the second aspect of the present invention, the center of the decline part is in a swell shape so that a change of an angle at the boundary point between the decline part and the flat part becomes small (becomes close to flat) and it is possible to prevent the web from bending out at the point. Additionally, according to the present invention, the center part of the decline part is shaped swell upward, thereby a polishing amount can be reduced when the worn cutting edge is polished.

Also, in the present invention, in the case where the lower knife is in cylindrical shape, the flat part is in cylindrical shape. The decline part is formed to have a diameter which is reduced smaller toward the outside in the width direction of the web, and the cutting edge part is formed to have a diameter which is increased larger toward the outside in the width direction of the web, thereby the radial contraction rate becomes larger at the outside in the width direction of the web than at the inside.

A third aspect of the present invention is characterized, in the first to second aspects, in that the upper knife and the lower knife are arranged with a clearance in a width direction of the web to make a droop height of the planographic printing plate at a cutting position 25 to 70 μm, a tip of a cutting edge of the lower knife has an acute angle of 70° or more, a top of the cutting edge is arranged to be lower than the flat part for holding a central part of the lower surface of the web, and a line connecting a cutting side end part of the flat part and the tip of the cutting edge has a level difference angle of 5° or less with respect to a horizontal line.

According to the present invention, the lower knife having the acute angle of 70° or more is used, and the level difference angle of the lower knife is set to 5° or less. Therefore, it is possible to prevent stain from being formed on the planographic printing plate, while securing a droop height on an upper surface of the planographic printing plate. At the same time, it is possible to suppress the generation of a burr, and to prevent a flaw from being caused at the time when the planographic printing plates are stacked. Note that the "droop height" in the present invention means an amount by which the upper surface of the planographic printing plate is lowered at the cutting position. Further, in the present invention, "up" and "down" represent a relative positional relation. When one of a pair of knives is set as an upper knife, and when the other of the pair of knives is set as a lower knife, the upper knife side is set as "up" and the lower knife side is set as "down". Further, in the present invention, "cutting" means to cut a planographic printing plate in its thickness direction, and includes cutting (so-called slitting) a long-sized web in the longitudinal direction and cutting the long-sized web in the width direction and in an oblique direction.

According to the present invention, the angle at the boundary point between the decline part and the flat part is 135° or more, thereby it is possible to prevent the web from bending out at the point. The boundary point between the decline part and the cutting edge part is provided so as to have the distance from the cutting edge in the width direction of the web which is greater or equal to the droop width of the product lower surface. Therefore, the generation of the scratch flaw can be suppressed.

BRIEF DESCRIPTION OF THE DRAWINGS

FIG. 9 is a front view showing cutting part configured differently from that shown in FIG. 2.

DETAILED DESCRIPTION OF THE PREFERRED EMBODIMENT

In the following, a preferred embodiment of a planographic printing plate manufacturing apparatus according to the present invention will be described with reference to the accompanying drawings.

Figure 1:
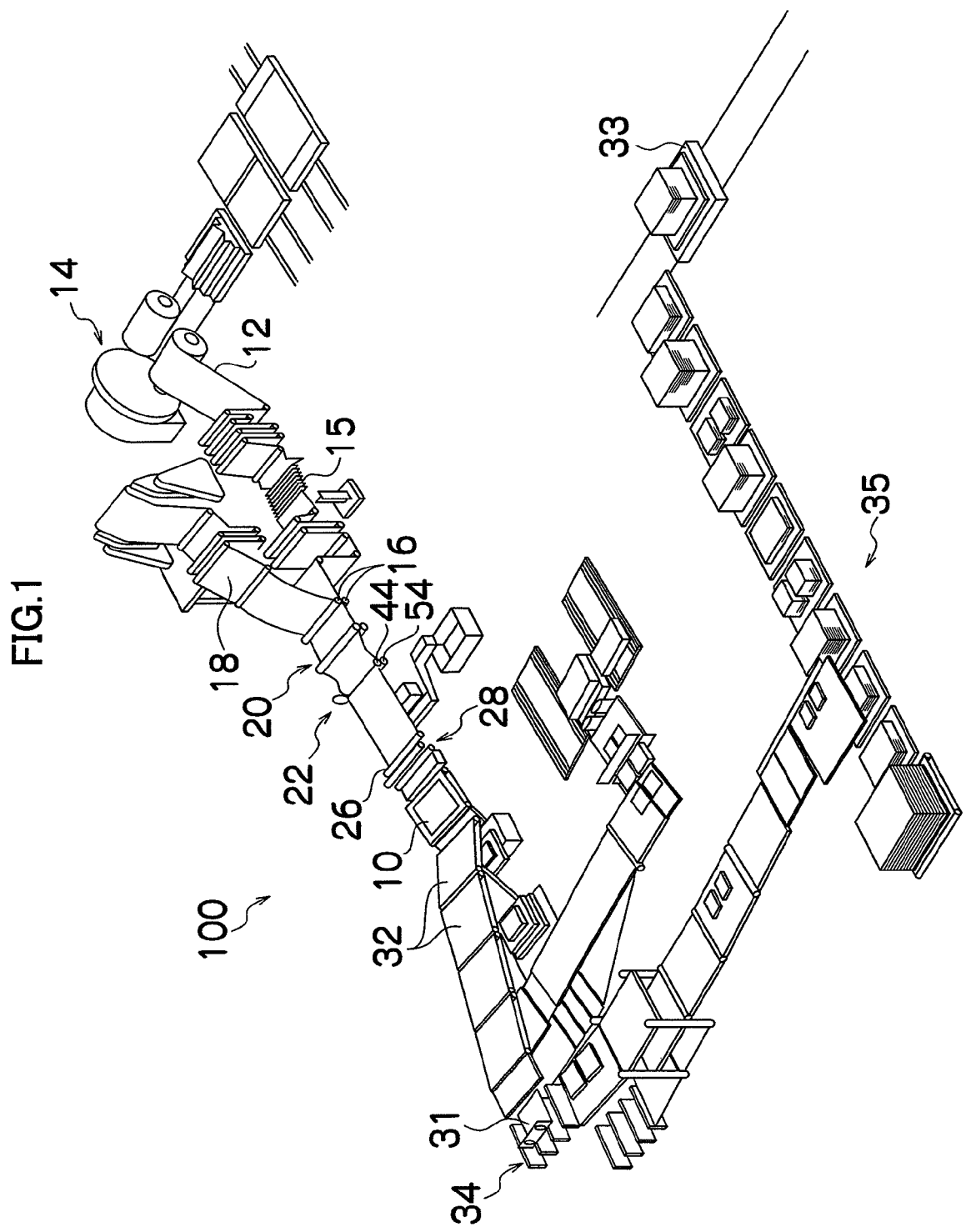
FIG. 1 is a perspective view showing a configuration of a planographic printing plate manufacturing apparatus according to the present embodiment.

FIG. 1 is a perspective view showing a configuration of the planographic printing plate manufacturing apparatus according to the present embodiment, and shows a processing line 100 of a sheet-like planographic printing plate 10 (hereinafter referred to as PS plate 10).

As shown in FIG. 1, a feeder 14 is arranged in the upstream side (right upper side in FIG. 1) of the processing line 100. A web 12 wound in a rolled shape beforehand is loaded to the feeder 14, and the web 12 is successively wound out from the feeder 14.

The long-sized web 12 fed from the feeder 14 is subjected to curl correction by a leveler 15. Thereafter, the web 12 is bonded with an interleaving paper 18 at a position of feed rollers 16 and 16, so that they are tightly contacted with each other by electrification. The web 12 made in tight contact with the interleaving paper 18 is fed to a notcher 20, by which a punched part is formed in the web 12. The web 12 in which the punched part is formed is fed to a cutting part (corresponding to a cutting processing section) 22, so as to be cut in the longitudinal direction. Knives (hereinafter also referred to as an upper knife 44 and a lower knife 54) of the cutting part 22 are adapted to be movable in the width direction of the web 12 at the position of the punched part, and adapted to be able to change the cutting width of the web 12 while continuously cutting the web 12. Note that the cutting part 22 will be described in detail below.

The feed length of the web 12 cut into a predetermined width is detected by a length measuring apparatus 26, so that the web 12 is cut by an inter-running cutter 28 at an instructed timing. Thereby, the PS plate 10 having a set size is manufactured. The PS plate 10 is sent to an accumulator 34 by a conveyor 32.

In the accumulator 34, a predetermined number of PS plates 10 are stacked, so that an accumulated bundle 31 is formed. Note that in the accumulator 34, it is also possible to arrange a protective sheet (generally referred to as "cardboard") made of a paperboard, or the like, on the upper and lower sides or one side of the accumulated bundle 31. The accumulated bundles 31 are stacked on a palette 33 through a feeding section 35. Thereafter, the accumulated bundles 31 are sent to a storage chamber, such as a rack warehouse, or to a packaging process, and are packaged by packaging materials (a tape, an internal packaging material, an external packaging material, and the like). Further, the accumulated bundles 31 can also be stacked on a skid (a flat-bed skid, a vertical type skid, or the like) for an automatic platemaking machine. Note that when the accumulated bundles 31 are stacked on the skid so as to be packaged, it may also be configured such that an accumulator for accumulating the accumulated bundles 31 on the skid is provided in the processing line 100, to directly accumulate the accumulated bundles 31 on the skid in the processing line 100. Note that the packaging form and the feeding form of the PS plates 10 are not limited to the above described forms. For example, the interleaving paper 18 and the other packaging materials may be omitted.

Figure 2:
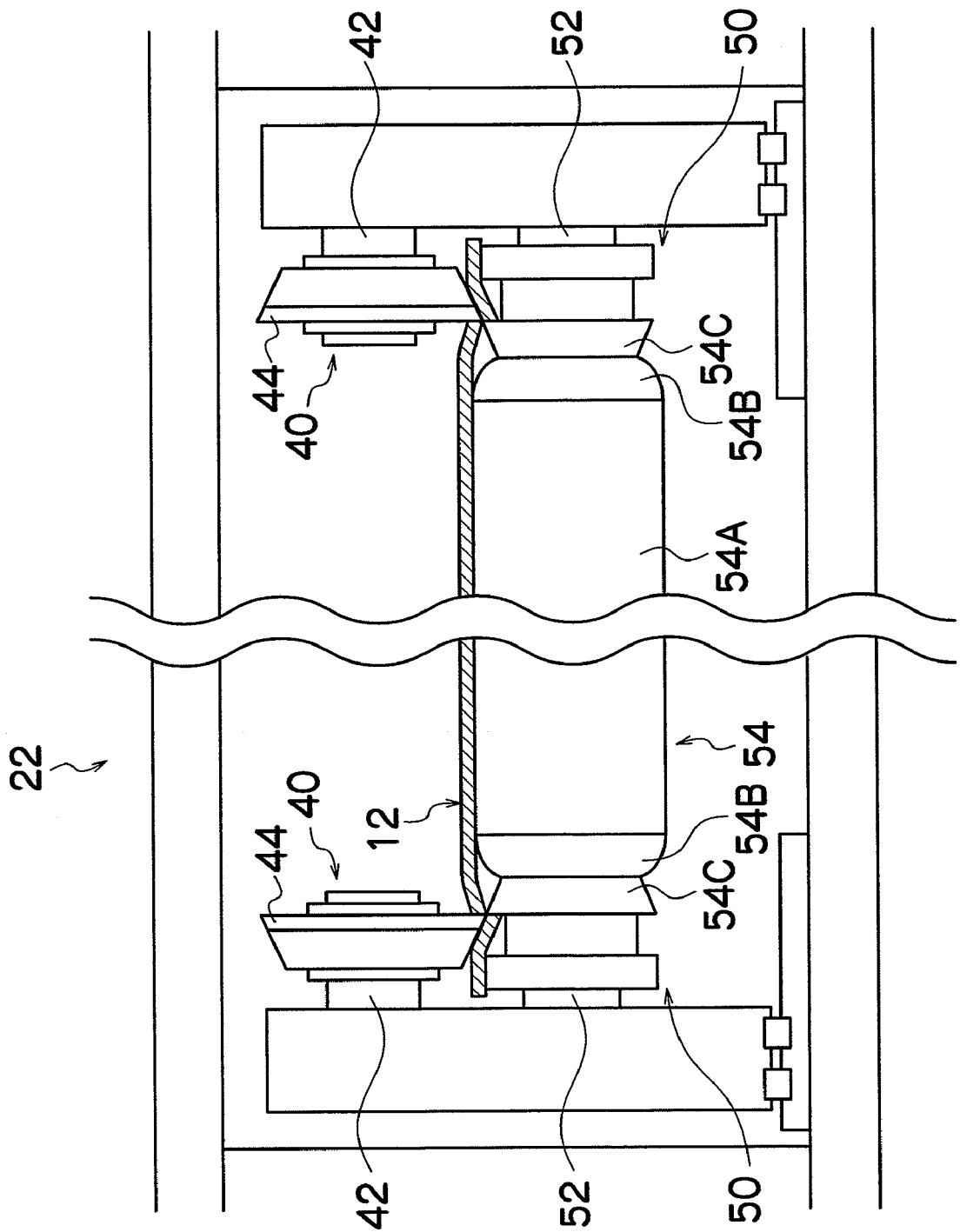
FIG. 2 is a front view showing a configuration of a cutting part.
Figure 3:
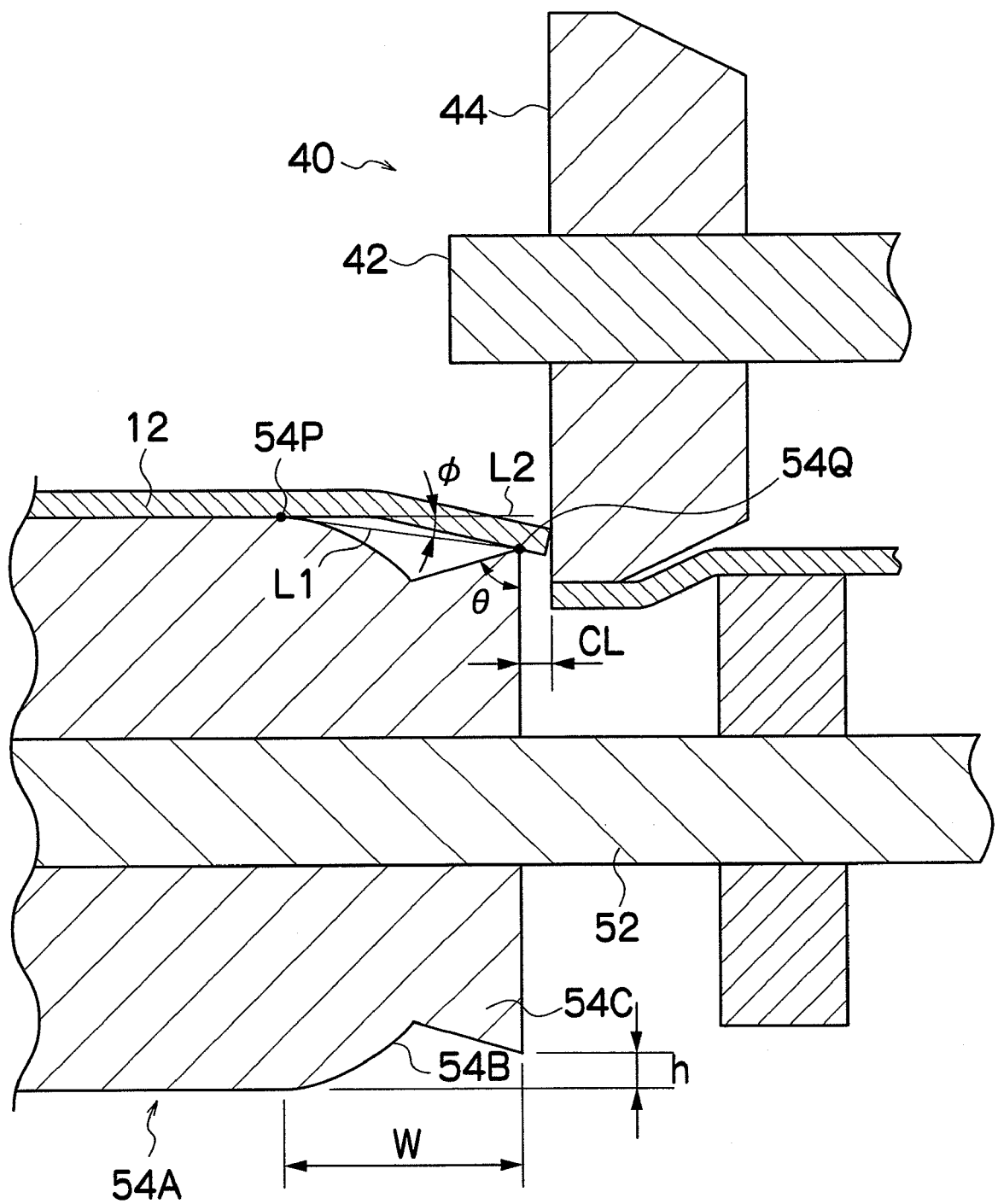
FIG. 3 is a sectional view showing a relationship between an upper knife and a lower knife.
Figure 4:
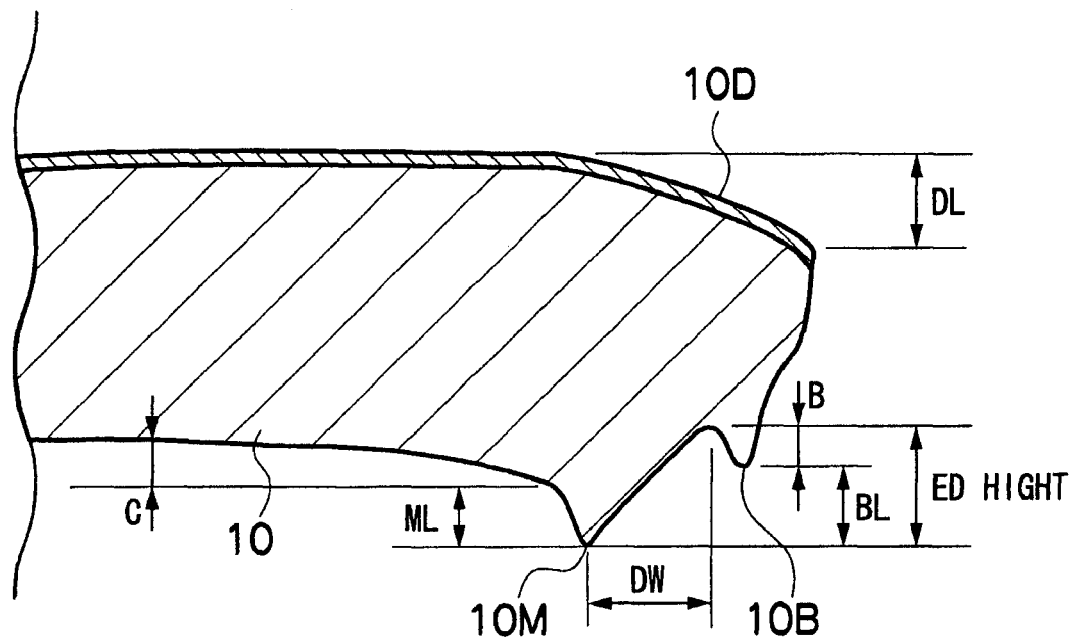
FIG. 4 is a cross sectional view at a cutting position of a PS plate cut by the cutting part according to the present invention.

FIG. 2 is a front view showing a configuration of the cutting part 22, and FIG. 3 is a sectional view showing a relationship between the upper knife 44 and the lower knife 54. Further, FIG. 4 shows a cross section at a cutting position of the PS plate 10 cut by the cutting part 22. Note that FIG. 4 shows a state where the printing surface is set upward.

As shown in FIG. 2, the cutting part 22 is provided with upper knife units 40, 40 and lower knife units 50, 50. In the upper knife unit 40, the upper knife 44 is supported by a horizontally arranged shaft 42 which is rotatably driven by a drive unit (not shown).

On the other hand, the lower knife unit 50 is provided with a shaft 52 arranged in parallel with the shaft 42 of the upper knife unit 40 and a lower knife 54, and the shaft 52 is adapted to be rotatably driven in linkage with the shaft 42 of the upper knife unit 40.

The lower knife 54 is integrally formed with a cylindrical part (flat part) 54A arranged in the center of the width direction of the web 12, radial contraction parts (decline parts) 54B, 54B formed at both ends of the cylindrical part 54A, and cutting edge parts 54C, 54C further formed at ends of the radial contraction parts 54B, 54B, and an outer surface of the lower knife 54 is successively formed. The cylindrical part 54A is a part to support the lower surface of the web 12 and is formed in a cylindrical shape with a fixed diameter.

The radial contraction part 54B is formed so as to have the outer circumferential surface successively formed with the outer circumferential surface of the cylindrical part 54A. In the meanwhile, the radial contraction part 54B is formed to have a diameter is reduced smaller toward the outside in the width direction of the web 12. Additionally, the outer circumferential surface of the radial contraction part 54B has the radial contraction rate getting larger at the end as shown in FIG. 3, and thereby the center of the outer circumferential surface is shaped swell. Therefore, a change of an angle of the outer circumferential surface is smaller at a boundary point 54P between the cylindrical part 54A and the radial contraction part 54B, so the outer circumferential surface is formed smooth.

The cutting edge part 54C is formed in a truncated cone shape whose diameter is increased toward the outside in the width direction of the web 12, and tip of cutting edge part (outermost projecting part) is a cutting edge 54Q. The cutting edge 54Q has a knife angle (angle θ shown in the sectional view of FIG. 3) of 70° or more at the end. In this way, by using the knife having the acute angle of 70° or more, the raised amount ML of a raised part 10M (see FIG. 4) formed on the lower surface of the PS plate 10 can be suppressed to 5 μm or less. That is, in the case where an acute angled knife having a lower knife angle θ of less than 70° is used, a large raised part 10M is formed near the cutting position on the lower surface of the PS plate 10 after the cutting process, and the raised part 10M causes a flaw when the PS plates are stacked. However, by using the acute angled knife having the lower knife angle θ of 70° or more, it is possible to prevent such large raised part 10M from being formed. Note that it is preferred to set the lower knife angle θ to satisfy a range: 70°<θ<90°, and it is more preferred to set the lower knife angle θ to satisfy a range: 75°≦θ≦85°.

Further, in the cutting edge part 54C, the outside diameter at tip of the cutting edge 54Q is smaller than the outside diameter of the cylindrical part 54A. Therefore, the cutting edge 54Q of the lower knife 54 is arranged lower the boundary point 54P of the cylindrical part 54A as shown in FIG. 3. Here, a line connecting the boundary point 54P to the cutting edge 54Q is set as L1, and an angle between the line L1 and a horizontal line L2 is set as a level difference angle φ. The level difference angle φ is preferably set larger than 0° and set to 5° or less, and is more preferably set to 1.5° or more and set to 3° or less. When the level difference angle φ is large, there are possibilities that the warp amount C (see FIG. 4) of the manufactured PS plate 10 is increased to cause a crack in the photosensitive layer on the surface of the PS plate, and stain is caused at the crack position, and that after the cutting process, the lower knife 54 interferes with the cut end surface of the PS plate 10 to cause damage to the PS plate 10. Further, when the level difference angle φ is set small, the quality of the PS plate 10 is liable to be varied. Note that the warp amount C means an amount by which the central side of the web 12 is warped upward, and, it is preferred that the warp amount C is 30 μm or less.

The lower knife 54 described above and the upper knife 44 are paired, and the web 12 is cut in the longitudinal direction thereof by being passed between the lower knife 54 and the upper knife 44. As shown in FIG. 3, the upper knife 44 and the cutting edge 54Q of the lower knife 54 are arranged with a predetermined clearance CL in the width direction of the web 12, and the clearance is set so as to make a droop height DL of the manufactured PS plate 10 (see FIG. 4) within a predetermined range. For example, the clearance CL is set to 20 to 80 μm so that the droop height DL of the PS plate 10 becomes 25 to 70 μm. Here, the droop height DL means an amount by which the upper surface (the surface on the side of the upper knife 44 at the time of cutting) of the PS plate 10 is lowered at the cutting position, as shown in FIG. 4.

Figure 5:
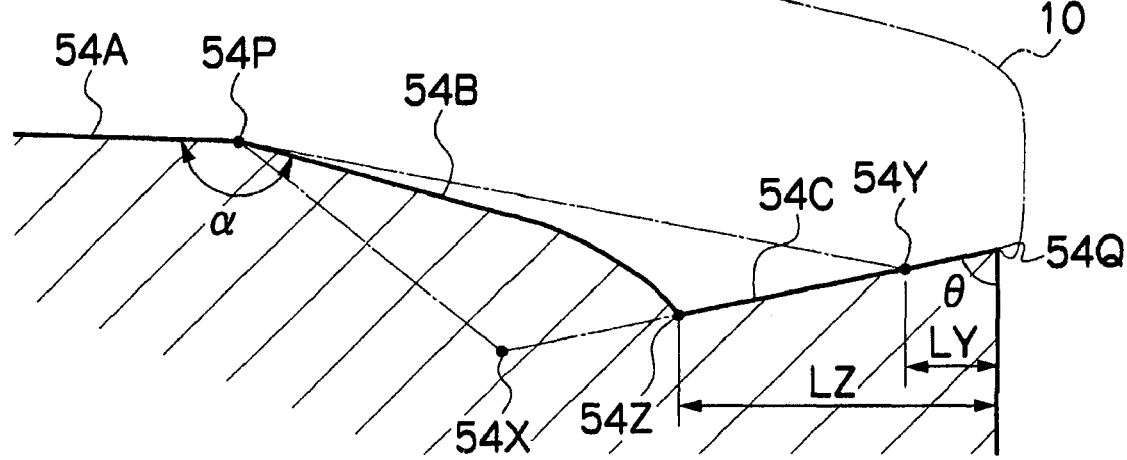
FIG. 5 is an explanatory diagram explaining a proper forming area of the lower knife.

Meanwhile, the described lower knife 54 is preferably formed as below. FIG. 5 is an explanatory diagram explaining a proper forming area of the lower knife, and showing a type of the cross section of the radial contraction part 54B. In FIG. 5, a point 54X is an intersectional point of the line angled of 135° at the boundary point 54P and the extended line of the cutting edge part 54C. A point 54Y is a point arranged to have a distance LY from the cutting edge 54Q in the width direction at the cutting edge part 54C, which is equal to a DW in FIG. 4 (the droop width of the PS plate 10). Moreover, a boundary point 54Z shows the boundary position between the radial contraction part 54B and the cutting edge part 54C.

The lower knife 54 is preferably provided in the area made with a line connecting the boundary point 54P, the point 54X and the point 54Y. Especially, an angle α at the boundary point 54P of the lower knife is preferably 135° or more. That is, in the case where the angle at the boundary point 54P is less than 135°, a bending flaw occurs on the cut PS plate 10 at the place contacting with the boundary point 54P.

Figure 6:
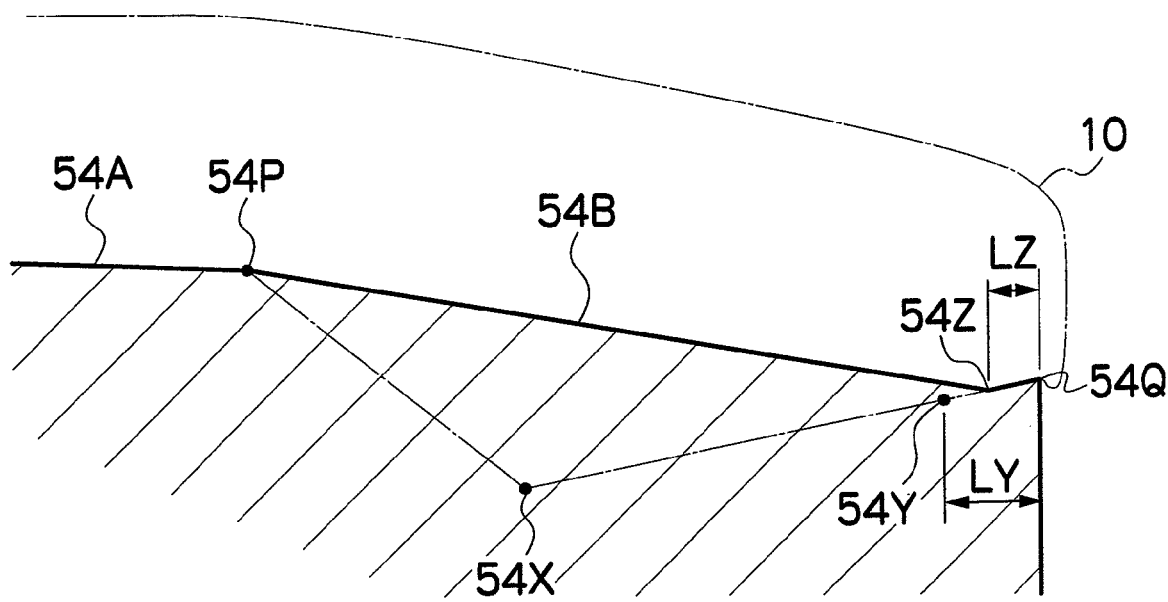
FIG. 6 is an explanatory diagram explaining an improper shape of the lower knife.

The lower knife 54 also preferably has the boundary point 54Z to locate to be closer to the center of the lower knife 54 in the longitudinal direction than the point 54Y. In other words, the boundary point 54Z is preferably formed so that a distance LZ from the cutting edge 54Q in the width direction is equal to the droop width DW or more. The droop width DW is a deformed part formed by the cutting edge part 54C when the PS plate 10 is cut with a lower knife with a large LZ (for example, the knife in the shape formed the line connecting the boundary point 54P, the point 54× and the point 54Q) as a test. Specifically, the DW is the distance between a depressed part which is formed on the closer to the center of the lower knife 54 in the longitudinal direction than the burr 10B shown in FIG. 4, and the raised part 10M. In this manner, the boundary point 54Z is provided so that the distance LZ from the cutting edge 54Q in the width direction is greater or equal to the droop width DW, thereby the droop width DW of the lower surface of the product is prevented being small by the small cutting edge part. In the result of that, the lower surface of the PS plate 10 can be prevented being damaged by contacting with the radial contraction part 54B. That is, as shown in FIG. 6, in the case where the boundary point 54Z is formed so that the distance LZ is smaller than the droop width DW, there are defects such that the lower surface of the PS plate 10 contacts with the radial contraction part 54B and gets damages as shown with chain double-dashed lines, and the droop width DW becomes small. However, the configuration shown in FIG. 5 can suppress the defects.

The radial contraction part 54B can be a combination of flat surfaces made with truncated cones (a shape formed with the fixed radial contraction rate). Also, in this case, the radial contraction part 54B is preferably formed in the area surrounded with the line connecting the point 54X, point 54Y and the boundary point 54P.

The shape of the cutting edge described above can be formed with tracing by a NC grinding machine. The way of forming of the cutting edge is not limited above, as long as the intended shape is obtained. The cutting edge can be formed by transferring the shape of the preformed blade, the electric discharging, the precision machines such as the wire cutting and the like.

Figure 7:
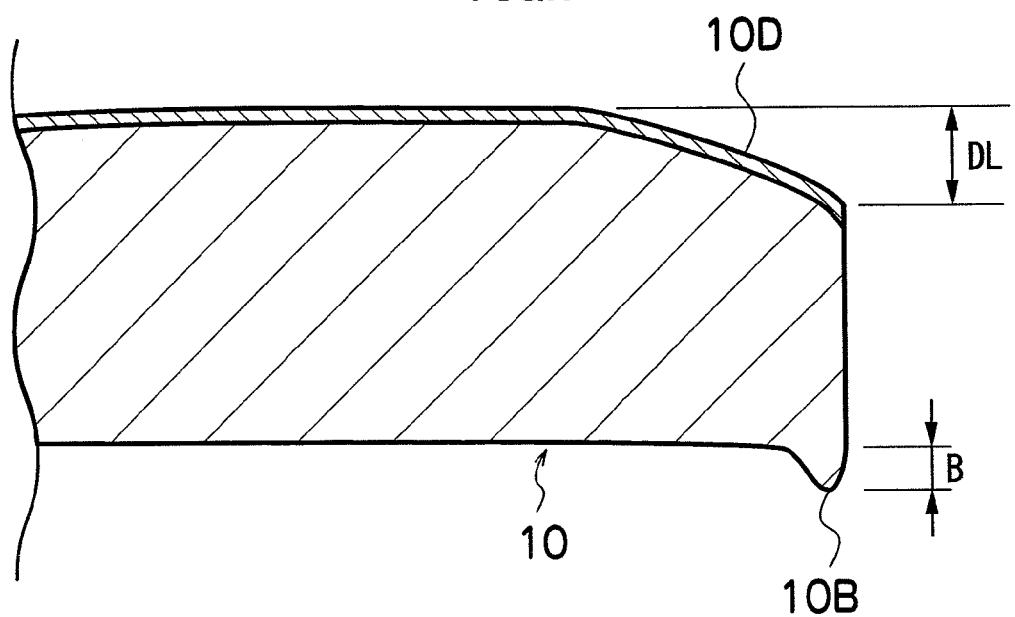
FIG. 7 is a cross sectional view at a cutting position of a PS plate cut by a conventional apparatus.

In the following, an operation of the planographic printing plate manufacturing apparatus configured as described above will be described with reference to FIG. 4 and FIG. 7. FIG. 7 is a cross sectional view at a cutting position of the PS plate cut by a conventional apparatus.

As shown in FIG. 7, in the PS plate 10 processed by the conventional apparatus, a droop deformation part 10D whose upper surface is lowered downward at the cutting position is formed, and a downward burr 10B is formed at the cutting position of the PS plate 10. Then, as the droop height DL is increased, it is possible to suppress the stain (edge stain) at the edge of the PS plate 10 from being caused at the time of printing. In this case, the droop height DL is preferably set to 25 to 70 μm. However, conventionally, when the droop height DL is set to 25 to 70 μm, the burr 10B is also enlarged with the increase in the droop height DL, resulting in a problem that the PS plates 10 are easily damaged when being stacked.

Thus, in the present embodiment, the clearance CL between the upper knife 44 and the lower knife 54 is not only set so as to make the droop height DL become 25 to 70 μm, but a knife having an acute angle of 70° or more is used as the lower knife 54, and the level difference angle φ of the lower knife 54 is set to 5° or less. By configuring the cutting part 22 in this way, it is possible to prevent the damage and stain from being caused, while securing the droop height DL of 25 to 70 μm. That is, as shown in FIG. 4, the projecting amount BL of the burr 10B formed downward at the cutting position of the PS plate 10 is suppressed to be zero or less. Here, the projecting amount BL of the burr 10B means an amount by which the burr 10B projects from the lower end position (the raised part 10M in the present embodiment) of the PS plate 10 in the inside of the burr 10B, and is a value which is defined as positive when the burr 10B projects downward from the lower end position. Further, in the present embodiment, by configuring the upper knife 44 and the lower knife 54 as described above, the raised amount ML of the raised part 10M formed near the cutting position on the lower surface of the PS plate 10 can be set to 5 μm or less.

Meanwhile, as shown in the present embodiment, in the case where the level difference is made by forming the cutting edge 54Q of the lower knife 54 so as to have the diameter smaller than the diameter of the cylindrical part 54A, the lower surface of the produced PS plate 10 at the end is lowered more than at the center, and thereby a phenomenon so called a warp occurs. When the warp is large, there are problems to cause a crack in the processing layer on the surface of the PS plate, and stain is caused at the crack position. Therefore, the warp amount C in FIG. 4 is preferably set to be small, in particular 30 μm or less. The warp amount C depends on the boundary point 54P, the interval W of the cutting edge 54Q in the width direction of the web 12, and the interval h in the vertical direction (thickness direction) of the web 12, thus it is necessary that the interval W and the interval h are set to be proper values at all times. In the case where the cutting edge 54Q of the lower knife 54 is worn, it is necessary that the positional relationship between the interval W and the interval h is readjusted by polishing processing with the NC grinding machine and the blade. At the time of polishing processing, when the radial contraction part 54B has a truncated cone surface, the surface needs to be widely polished, and the problem such that the polishing amount increases occurs.

Figure 8A:
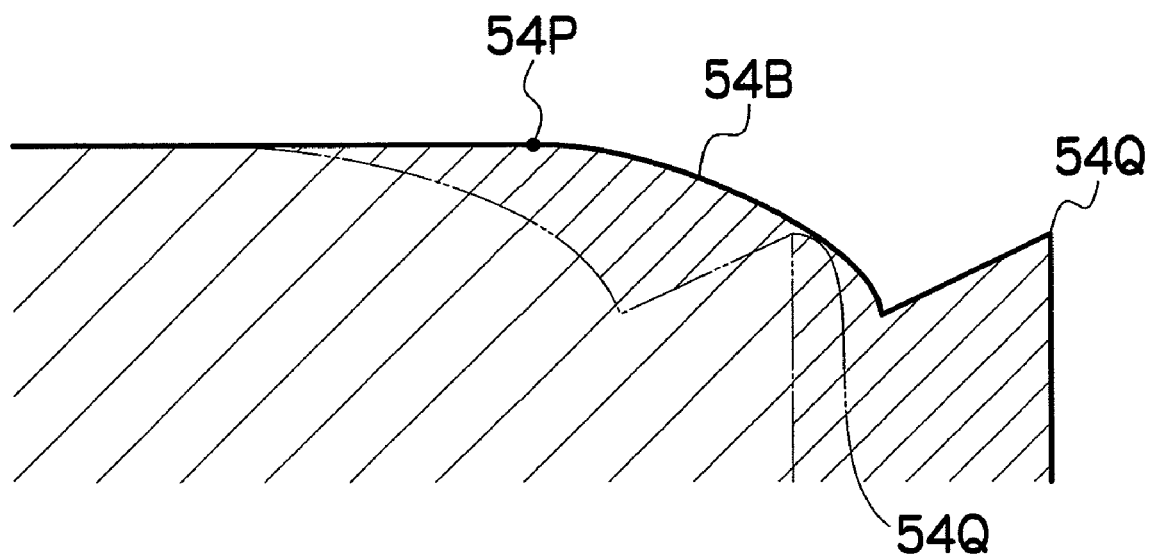
FIGS. 8A and 8B are explanatory diagrams explaining a polishing processing of a cutting edge.
Figure 8B:
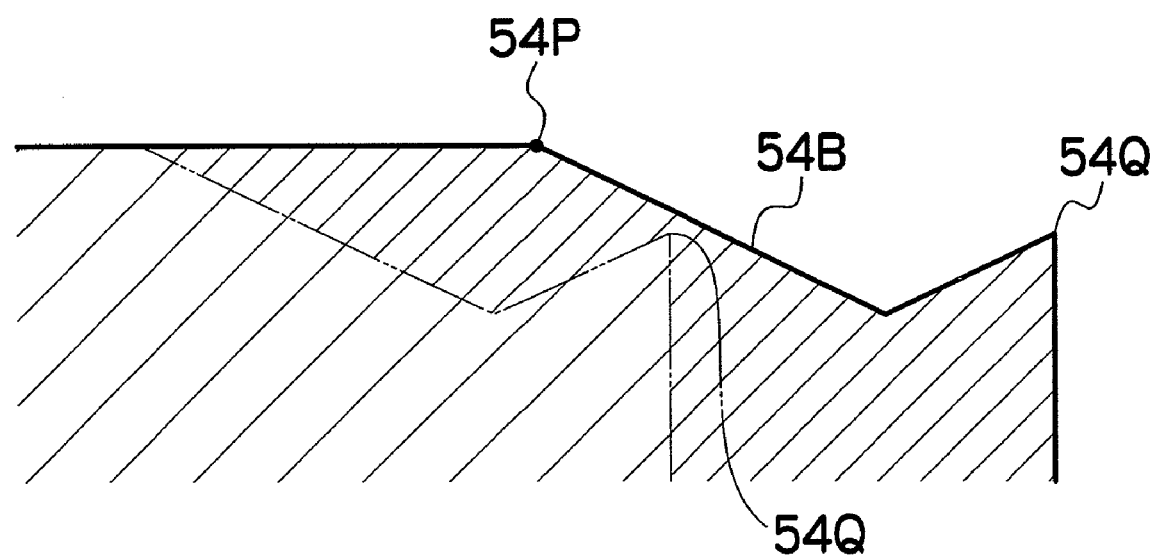

On the other hand, in the present embodiment, the radial contraction parts 54B, 54B of the lower knife 54 are shaped swell. Therefore, it is possible to reduce the polishing amount by newly forming the cutting edge 54Q at swell. That is, as shown in FIG. 8B, when the radial contraction part 54B having a linear shape is formed, a new cutting edge 54Q can be formed farther inside as shown with chain double-dashed lines, and thereby the polishing part (the area hatched with fine diagonal lines) is large. In contrast, as shown in FIG. 8A, in the case where the radial contraction part 54B having the swell shape, the new cutting edge 54Q can be formed so as to be close to the circumferential surface of the cutting edge 54Q before it is worn as shown with chain double-dashed lines, and thereby the polishing part (the area hatched with fine diagonal lines) can be reduced.

Additionally, in the present embodiment, the radial contraction part 54B is shaped swell, thus a change of an angle of the outer circumferential surface is smaller at a boundary point 54P between the cylindrical part 54A and the radial contraction part 54B, so the outer circumferential surface is formed smooth. Especially, the angle at the boundary point 54P of the lower knife is set to be 135° or more in the present embodiment, so that it is possible to prevent the PS plate 10 from being damaged with the bending flaw at the boundary point 54P without fail. In addition, a roundness processing of φ4 mm or more at the boundary point 54P is preferably performed so that the bend of the PS plate 10 can be surely suppressed.

In the present embodiment, the boundary point 54Z between the radial contraction part 54B and the cutting edge part 54C is formed so that a distance LZ from the cutting edge 54Q in the width direction is more than the droop width DW. Therefore, it is possible to prevent the lower knife 54 from scratching and damaging the PS plate 10 with contacting.

In the above described embodiment, the example that both ends of the web 12 are cut in the cutting part is explained but as shown in FIG. 9, it is possible to configure that the center of the web 12 is disintermediated. A cutting part 23 of the FIG. 9 is provided with upper knife units 40 and 40 and lower knife units 50 and 50 in the center in the width direction. The configuration of the upper knife unit 40 and the lower knife unit 50 are same as the described embodiment above, and the explanation is omitted. The polishing part can be reduced with the cutting part 23 having such configuration by having the radial contraction part 54B described above. At the same time, it is possible to prevent the PS plate 10 from damaging with the bend flaw and the scratch flaw.

In the following, there will be described the web 12 and the PS plate 10 which are preferably used in the present invention.

In the web 12, a photosensitive layer (or heat sensitive layer) is formed beforehand on a supporting body made of aluminum, and the surface on which the photosensitive layer (or heat sensitive layer) is formed is used as an image forming surface (the surface of the web 12) of the PS plate 10. The web 12 is processed by the processing line 100 so as to have a desired size, and thereby becomes the PS plate 10 which can be used for the printing.

Further, as the aluminum plate used as the supporting body, it is possible to apply, for example, JIS1050 material, JIS1100 material, JIS1070 material, an Al—Mg based alloy, an Al—Mn based alloy, an Al—Mn—Mg based alloy, an Al—Zr based alloy, an Al—Mg—Si based alloy, and the like. In the manufacturing process of the aluminum plate in a manufacturer, after an aluminum ingot which complies with the above described standards is manufactured and subjected to hot rolling, the aluminum ingot is subjected to a heat treatment referred to as annealing as required, and subjected to cold rolling, so as to thereby be formed into a belt-shaped aluminum plate having a predetermined thickness.

The PS plate 10 is formed by applying a coating film (a photosensitive layer in the case of a photosensitive printing plate, and a heat sensitive layer in the case of a heat sensitive printing plate) to one surface of the thin aluminum plate formed into a rectangular plate shape. The coating film is subjected to plate making processing, such as the exposure, developing processing and the gumming processing. Then, the PS plate is set to a printing machine, and ink is applied to the surface of the PS plate, so that characters, images, and the like are printed on a paper surface.

Note that the specific configuration of the PS plate 10 (web 12) is not limited in particular. However, a planographic printing plate by which the plate making can be directly performed from digital data, can be obtained by forming the planographic printing plate as a heat mode laser printing plate and a photon method laser printing plate.

Also, the surface to which the coating film is applied is referred to as an image forming surface, and the surface opposite the image forming surface, that is, the surface to which the coating film is not applied, is referred to as non-image forming surface. Note that the PS plate 10 of the present embodiment is a plate in a stage before the processing (exposure, development, and the like) required for the printing is performed, and may also be referred to as a planographic printing original plate or a planographic printing plate material in some cases.

Further, the PS plate 10 can be formed into planographic printing plates corresponding to various platemaking methods by selecting various components in the photosensitive layer or the heat sensitive layer. As examples of specific modes of the planographic printing plate according to the present invention, the following modes (1) to (11) are listed.

(1) a mode in which the photosensitive layer contains an infrared absorbing agent, a compound which generates acid by heat, and a compound which is cross-linked by acid.

(2) a mode in which the photosensitive layer contains an infrared absorbing agent and a compound which is made alkali-soluble by heat.

(3) a mode in which the photosensitive layer includes two layers: a layer containing a compound which generates a radical by laser-beam irradiation, an alkali-soluble binder, and a poly-functional monomer or a pre-polymer; and an oxygen barrier layer.

(4) a mode in which the photosensitive layer includes two layers: a physical development nucleus layer; and a silver halide emulsion layer.

(5) a mode in which the photosensitive layer includes three layers: a polymer layer containing a poly-functional monomer and a poly-functional binder; a layer containing silver halide and a reducing agent; and an oxygen barrier layer.

(6) a mode in which the photosensitive layer includes two layers: a layer containing novolak resin and naphthoquinonediazide; and a layer containing silver halide.

(7) a mode in which the photosensitive layer includes an organic photo conductor.

(8) a mode in which the photosensitive layer includes two to three layers: a laser beam absorbing layer removed by laser beam irradiation; an oleophilic layer; and/or a hydrophilic layer.

(9) a mode in which the photosensitive layer contains a compound which absorbs energy to generate acid, a polymer compound having, in a side chain, a functional group which generates sulfonic acid or carboxylic acid with acid, and a compound which gives energy to an acid generator by absorbing visible light.

(10) a mode in which the photosensitive layer contains a quinonediazide compound and novolac resin.

(11) a mode in which the photosensitive layer contains a compound which is decomposed by light or ultraviolet rays to form a cross linked structure by itself or with other molecules in the layer, and an alkali-soluble binder.

In particular, in recent years, there may be used a planographic printing plate coated with a high sensitivity photosensitive type coating film which is to be exposed by a laser beam, and a heat sensitive type planographic printing plate (for example, the above described modes (1) to (3), or the like).

Note that the wavelength of a laser beam here is not limited in particular, and as the lasers having applicable wavelength regions, the following lasers are, for example, listed.

(a) A laser having a wavelength region of 350 to 450 nm (as a specific example, a laser diode having a wavelength of 405±5 nm).

(b) A laser having a wavelength region of 480 to 540 nm (as specific examples, an argon laser having a wavelength of 488 nm, a (FD) YAG laser having a wavelength of 532 nm, a solid-state laser having a wavelength of 532 nm, and a (green) He—Ne laser having a wavelength of 532 nm).

(c) A laser having a wavelength region of 630 to 680 nm (as specific examples, a He—Ne laser having a wavelength of 630 to 670 nm and a red semiconductor laser having a wavelength of 630 to 670 nm).

(d) A laser having a wavelength region of 800 to 830 nm (as a specific example, an infrared (semiconductor) laser having a wavelength of 830 nm).

(e) A laser having a wavelength region of 1064 to 1080 m (as a specific example, a YAG laser having a wavelength of 1064 nm).

Among these laser beams, any of the laser beams having the wavelength regions of (b) and (c) is applicable to any of the planographic printing plates which have the photosensitive layers of the above described modes of (3) and (4), or a planographic printing plate having a heat sensitive layer. Further, any of the laser beams having the wavelength regions of (d) and (e) is applicable to any of the planographic printing plates which have the photosensitive layers of the above described modes of (1) and (2), or a planographic printing plate having a heat sensitive layer. Of course, the relationship of a laser beam wavelength region with a photosensitive layer, or with a heat sensitive layer is not limited to these.

The shape of the PS plate 10 is not limited in particular. For example, the PS plate may be an aluminum plate, and the like, having a thickness of 0.1 to 0.5 mm, a long side length (width) of 200 to 1650 mm, and a short side length (length) of 200 to 3150 mm, and having one surface coated with a photosensitive layer or a heat sensitive layer.

As the interleaving paper 18 which is used in the present invention, interleaving papers generally used for the planographic printing plate may be used, and typical examples of these papers are shown as follows. The specific configuration of the interleaving paper 18 is not limited in particular, as long as the interleaving paper 18 is capable of surely protecting the coating film of the PS plate 10. For example, there may be used, as the interleaving paper 18, a paper using wood pulp in an amount of 100%, a paper using synthetic pulp in which the wood pulp is not used in an amount of 100%, a paper having a low density polyethylene layer formed on the surface of these papers, and the like.

Particularly, since the material cost is low in the paper without using the synthetic pulp, and hence the interleaving paper 18 can be manufactured at low cost. More specifically, there is listed an interleaving paper which is produced from bleached kraft pulp and which have a basis weight of 20 to 55 g/m$^2$, a density of 0.7 to 0.85 g/cm$^3$, a moisture content of 4 to 6%, a Bekk smoothness of 10 to 800 seconds, a PH value of 4 to 6, and an air permeability of 15 to 300 sec, but the interleaving paper applicable in the present invention is not limited to this.

The interleaving paper 18 can be cut with the product at the same time or beforehand. The interleaving paper 18 can be also omitted.

What is claimed is:

1. A planographic printing plate manufacturing apparatus comprising:

a cutting process section which cuts a web of a planographic printing plate in a thickness direction of the web by pinching the web with at least a pair of an upper knife and a lower knife, wherein the lower knife includes a flat part supporting a center of the web, a decline part gradually declined an upper end toward outside from the flat part, and a cutting edge part having an upper end gradually raised toward outside from the decline part to be a cutting edge, an angle of the lower knife at a boundary point between the decline part and the flat part is 135° or more, a boundary point between the decline part and the cutting edge part is provided so as to have a distance from the cutting edge in a width direction of the web which is greater or equal to a droop width of a lower surface of a product after the cutting process, and wherein the upper knife and the lower knife are arranged with a clearance in the width direction of the web to make a droop height of the planographic printing plate at a cutting position 25 to 70 µm, and a tip of a cutting edge of the lower knife has an acute angle of 70° or more, a top of the cutting edge is arranged to be lower than the flat part for holding a central part of the lower surface of the web, and a line connecting a cutting side end part of the flat part and the tip of the cutting edge has a level difference angle of more than 0° and 5° or less with respect to a horizontal line.

2. A planographic printing plate manufacturing apparatus comprising:

a cutting process section which cuts a web of a planographic printing plate in a thickness direction of the web by pinching the web with at least a pair of an upper knife and a lower knife, wherein the lower knife includes a flat part supporting a center of the web, a decline part gradually declined an upper end toward outside from the flat part, and a cutting edge part having an upper end gradually raised toward outside from the decline part to be a cutting edge, and the decline part is shaped swell upward; and wherein the upper knife and the lower knife are arranged with a clearance in the width direction of the web to make a droop height of the planographic printing plate at a cutting position 25 to 70 µm, and a tip of a cutting edge of the lower knife has an acute angle of 70° or more, a top of the cutting edge is arranged to be lower than the flat part for holding a central part of the lower surface of the web, and a line connecting a cutting side end part of the flat part and the tip of the cutting edge has a level difference angle of more than 0° and 5° or less with respect to a horizontal line.

* * * * *